(12) United States Patent
Park

(10) Patent No.: US 7,619,770 B2
(45) Date of Patent: Nov. 17, 2009

(54) PRINTING METHOD OF MAKING A BOOKLET

(75) Inventor: Eun-ok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 864 days.

(21) Appl. No.: 11/126,349

(22) Filed: May 11, 2005

(65) Prior Publication Data

US 2005/0254093 A1    Nov. 17, 2005

(30) Foreign Application Priority Data

May 13, 2004    (KR)    ...................... 10-2004-0033987

(51) Int. Cl.
*G06K 15/00* (2006.01)
(52) U.S. Cl. .................... 358/1.18; 358/1.15; 358/1.13; 715/243; 715/253; 715/567; 715/277
(58) Field of Classification Search ................ 358/1.18, 358/1.15, 1.13; 715/243, 253, 567, 277
See application file for complete search history.

(56) References Cited

U.S. PATENT DOCUMENTS

| | | | | |
|---|---|---|---|---|
| 5,768,448 A | * | 6/1998 | Ichinose | ...................... 382/312 |
| 5,903,903 A | * | 5/1999 | Kennedy | ...................... 715/234 |
| 6,417,931 B2 | * | 7/2002 | Mori et al. | .................. 358/1.15 |
| 7,031,001 B2 | * | 4/2006 | Nakagiri et al. | .............. 358/1.1 |
| 7,046,385 B2 | * | 5/2006 | Mori et al. | .................. 358/1.15 |
| 7,180,608 B1 | * | 2/2007 | Yu | .............................. 358/1.1 |
| 7,260,778 B2 | * | 8/2007 | Baron et al. | ................. 715/248 |
| 7,428,072 B2 | * | 9/2008 | Suzuki | ...................... 358/1.18 |
| 2001/0039554 A1 | * | 11/2001 | Iwasaki | ....................... 707/525 |

FOREIGN PATENT DOCUMENTS

| | | |
|---|---|---|
| JP | 62-213374 | 9/1987 |
| JP | 63-72552 | 4/1988 |
| JP | 07-74920 | 3/1995 |
| KR | 2003-7192 | 1/2003 |

* cited by examiner

*Primary Examiner*—Twyler L Haskins
*Assistant Examiner*—Jacky X Zheng
(74) *Attorney, Agent, or Firm*—Stanzione & Kim LLP

(57) ABSTRACT

A printing method of making a booklet includes requesting a printing task, calculating a number of pages corresponding to a printing range, arranging the pages according to a predetermined page layout, reducing images of the pages according to the predetermined page layout, and composing the reduced images of the pages into a single image in response to the predetermined page layout to transmit the single image. An N-up operation and a duplex operation may be used to allow the portable booklet to be readily made, and a title page and a punching space may be taken into consideration.

19 Claims, 8 Drawing Sheets

PRINTING METHOD OF MAKING A BOOKLET

CROSS-REFERENCE TO RELATED APPLICATIONS

This application claims benefit under 35 U.S.C. § 119 from Korean Patent Application No. 2004-33987, filed on May 13, 2004, the content of which is incorporated herein in its entirety and by reference.

BACKGROUND OF THE INVENTION

1. Field of the Invention

The present general inventive concept relates to a printing method of making a booklet, and in particular, to a printing method of making a booklet by performing an N-up operation and a duplex operation to allow a user to make a portable booklet.

2. Description of the Related Art

A printer driver and a program associated with the same are installed in a host connected to a printer in order to drive the printer. When a user enters a printing command from an application program of the host, the application program delivers data of a document to the printer driver, which in turn converts the data of the document into a language that can be understood by the printer. The converted data is delivered to a control board of the printer through a printer interface.

The user may change an operation of the printer by using the printer driver. The printer driver is provided with a registration information window (typically, referred to as a standard tab) capable of setting printing options including sheet setting, printing quality, graphic mode, and so forth, and the user may variously change the setting of the printing options by using the registration information window which is displayed on an output device (e.g., a monitor) of the host.

When the user prints one or more documents, an N-up operation is utilized. The N-up operation reduces an image of a page of the documents to a size of 1/N such that N page images are included on any one surface of a printing sheet. The N-up operation is used because it has advantages of reducing the number of printing sheets necessary to print the documents and being readily portable. The N-up operation and a duplex operation (that is, an operation of printing on both surfaces of a printing sheet) are employed to print the documents, which enables a booklet to be made. However, the conventional printing methods are only for making a 2-up booklet.

SUMMARY OF THE INVENTION

The present general inventive concept provides a printing method of making a booklet, which allows the booklet to be readily portable, using an N-up operation and a duplex operation.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a printing method of making a booklet, the method comprising requesting a printing task, calculating a number of pages corresponding to a printing range, arranging the pages within the printing range according to a predetermined page layout, reducing images of the pages according to the predetermined page layout, and composing the reduced images of the pages into a single image according to the predetermined page layout and transmitting the single image.

The method may further comprise checking whether an option of selecting a title page is set, and preparing a predetermined page to allow a title to be entered as a first page of the single image when the option of selecting the title page is set.

The method may further comprise setting a punching space of a predetermined size, and reducing the images of the pages according to the predetermined page layout with respect to a remaining area after the punching space is excluded from a total area of each printing sheet when an option of selecting the punching space is set.

A duplex operation may be automatically set in the printing method.

A plurality of pages may be arranged on a front surface of the printing sheet according to the predetermined page layout based on the following equation, $$\{2(4(N+km)-3), 2*4(N+km)-5, 2(4(N+km)-1), 2*4(N+km)-1\},$$

wherein N is a grouping variable representing 4 page images grouped into one group, and k is a value equal to the number of total page images to be included in any one surface of one printing sheet divided by 4, and m is a value equal to a number of printing sheets to be printed minus one.

A plurality of pages may be arranged on a back surface of the printing sheet according to the predetermined page layout based on the following equation, $$\{2*4(N+km)-7, 4(2(N+km)-1), 2*4(N+km)-3, 2*4(N+km)\},$$

wherein N is a grouping variable representing 4 page images grouped into one group, and k is a value equal to the number of total page images to be included in any one surface of one printing sheet divided by 4, and m is a value equal to the number of printing sheets to be printed minus one.

An upper group of four pages and a lower group of four pages of the front surface of the printing sheet may be calculated based on the following respective equations when the number of pages per the printing sheet is set as 8 so that 16 pages are to be printed in total on the front and back surfaces of the printing sheet according to the predetermined page layout, $$(i/2, i/2+1, i/2-2, i/2+3)$$

$$(i/2-4, i/2+5, i/2-6, i/2+7)$$

wherein i is the number of total page images to be included on the front and back surfaces of one printing sheet.

An upper group of four pages and a lower group of four pages of the back surface of the printing sheet may be calculated based on the following respective equations when the number of pages per the printing sheet is set as 8 so that 16 pages are to be printed in total on the front and back surfaces of the printing sheet according to the predetermined page layout, $$(i/2+2, i/2-1, i/2+4, i/2-3)$$

$$(i/2+6, i/2-5, i/2+8, i/2-7)$$

wherein i is the number of total page images to be included on the front and back surfaces of one printing sheet.

An upper left group of four pages and lower left group of four pages of the front surface of the printing sheet may be calculated based on the following respective equations when the number of pages per the printing sheet is set as 16 so that 32 pages are to be printed in total on the front and back surfaces according to the predetermined page layout, (i/2, i/2+1, i/2−2, i/2+3)

(i/2−4, i/2+5, i/2−6, i/2+7)

wherein i is the number of total page images to be included on the front and back surfaces of one printing sheet.

Right pages on the front surface of the printing sheet may be obtained by adding 8 to or subtracting 8 from corresponding left pages.

An upper right group of four pages and a lower right group of four pages of a back surface of a printing sheet are calculated based on the following respective equations when the number of pages per the printing sheet is set as 16 so that 32 pages are to be printed in total on the front and back surfaces according to the predetermined page layout, (i/2+2, i/2−1, i/2+4, i/2−3)

(i/2+6, i/2−5, i/2+8, i/2−7)

wherein i is the number of total page images to be included on the front and back surfaces of one printing sheet.

Left pages of the back surface of the printing sheet may be obtained by adding 8 to or subtracting 8 from corresponding right pages.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
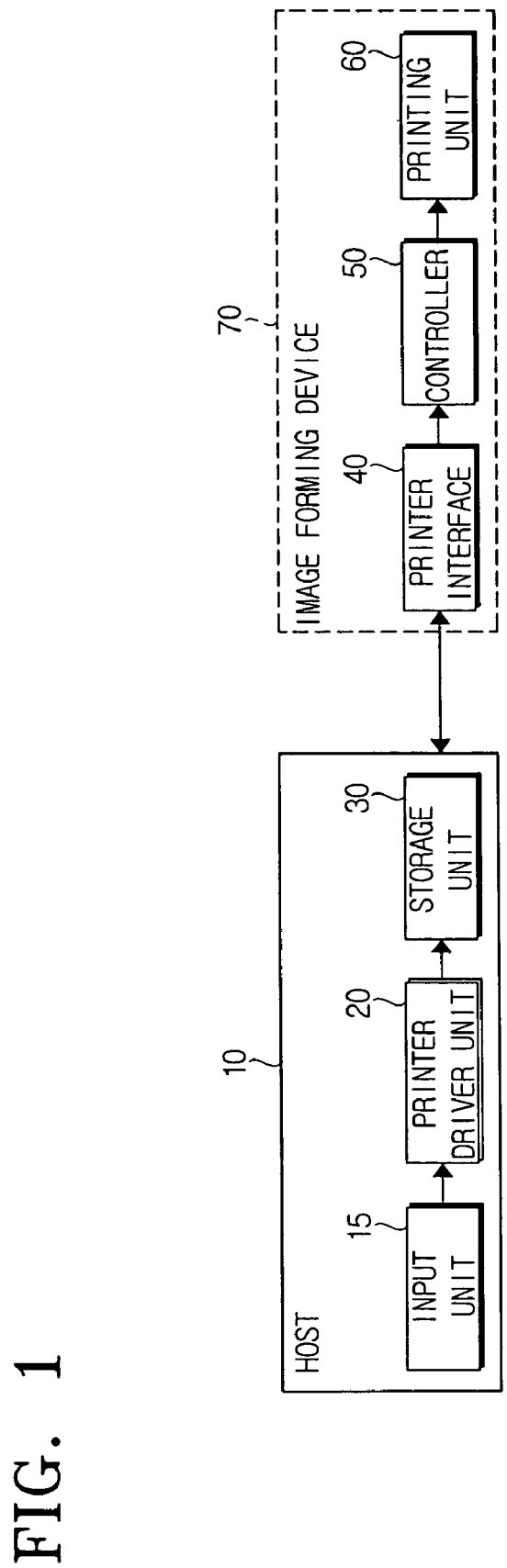
FIG. 1 is a block diagram illustrating a printing system to make a booklet according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a printing system to make a booklet according to an embodiment of the present general inventive concept. Referring to FIG. 1, the printing system comprises a host 10 and an image forming device 70. The host 10 can include an input unit 15, a printer driver unit 20 installed inside of the host 10, and a storage unit 30. The image forming device 70 can include a printer interface 40, a controller 50, and a printing unit 60.

The host 10 receives a printing command from a user through the input unit 15 (e.g., keypad, etc.) and delivers the printing command to the printer driver unit 20 installed inside of the host 10. The printing command that is delivered to printer driver unit 20 through the input unit 15 includes printing information and booklet operation information.

The printer driver unit 20 converts a document into data suitable to be used in an emulation process in response to the printing command. Also, the printer driver unit 20 forms a booklet according to the booklet operation information. The storage unit 30 stores data converted in the printer driver unit 20 and also stores the formed booklet.

The printer interface 40 interfaces the host 10 with the image forming device 70, and the controller 50 of the image forming device 70 receives the printing data through the printer interface 40. The controller 50 controls general operations of the image forming device 70 including the emulation operation of the converted data, and controls the printing unit 60 to perform a printing operation. The image forming device 70 prints the formed booklet of the host 10.

Figure 2:
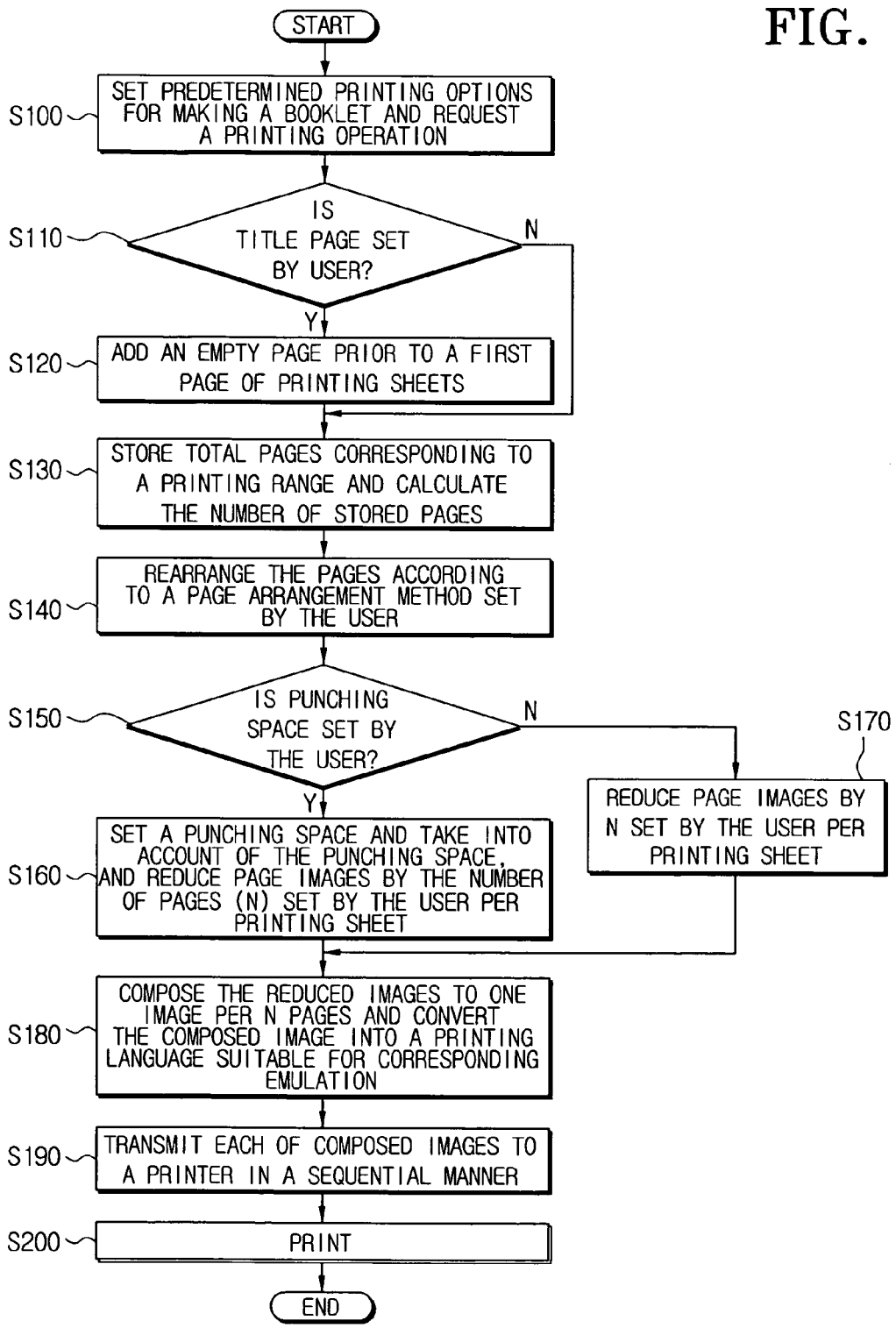
FIG. 2 is a flow chart illustrating a printing method of making a booklet according to an embodiment of the present general inventive concept.

FIG. 2 is a flow chart illustrating a printing method of making a booklet according to an embodiment of the present general inventive concept. Referring to FIG. 2, the user sets predetermined printing options corresponding to making a portable booklet through a user interface, and requests a printing operation (S100).

The printing options set by the user can include an option of selecting the number of pages per sheet, an option of selecting a punching space, an option of selecting a title page, an option of selecting a printing range, an option of setting a page location, and so forth.

When the user selects the option of selecting the page location, a duplex operation may be automatically set.

Figure 3:
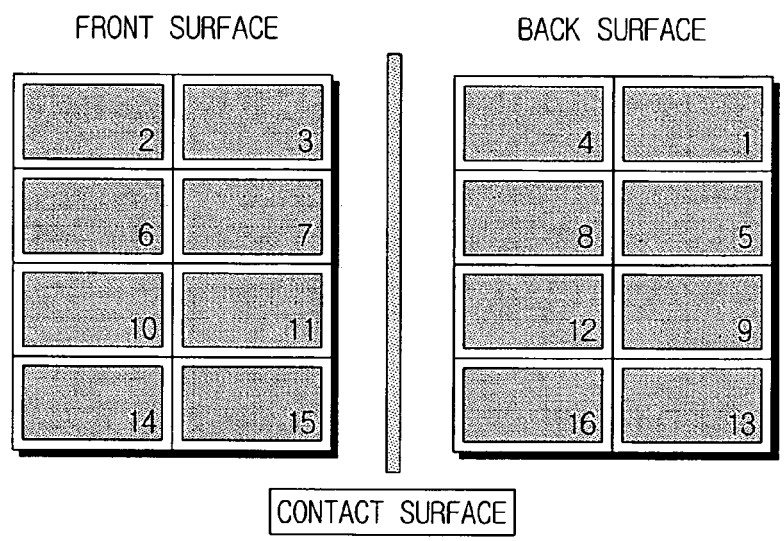
FIG. 3 is a diagram illustrating an arrangement of page images, according to an embodiment of the present general inventive concept, when a user sets a number of pages per sheet to 8 so that 16 pages are printed in total.

FIG. 3 is a diagram illustrating an arrangement of page images according to an embodiment of the present general inventive concept when the user sets the number of pages per sheet to 8 so that 16 pages of the document are printed in total on front and back surfaces of a printing sheet.

Referring to FIG. 3, page numbers of the page images arranged on the front surface of the printing sheet, namely, (2, 3, 6, 7) and (10, 11, 14, 15) are obtained based on equation 1, and arranged as illustrated in FIG. 3.

$$\{2(4(N+km)-3), 2*4(N+km)-5, 2(4(N+km)-1), 2*4(N+km)-1\} \quad \text{Equation 1}$$

In addition, page numbers of the page images arranged on the back surface of the printing sheet, namely, (1, 4, 5, 8) and (9, 12, 13, 16) are obtained based on equation 2, and arranged as illustrated in FIG. 3.

$$\{2*4(N+km)-7, 4(2(N+km)-1), 2*4(N+km)-3, 2*4(N+km)\} \quad \text{Equation 2}$$

In the equations 1 and 2, N indicates a grouping variable representing 4 page images grouped into one group. For example, when N is 1, the 4 page images grouped together on the front surface of the printing sheet are the page images with the page numbers (2, 3, 6, 7), and the 4 page images grouped together on the back surface of the printing sheet are the page images with the page numbers (1, 4, 5, 8). Further, when N is 2, the 4 page images grouped together on the front surface of the printing sheet are the page images with the page numbers (10, 11, 14, 15), and the 4 page images grouped together on the back surface of the printing sheet are the page images with the page numbers (9, 12, 13, 16).

Figure 4:
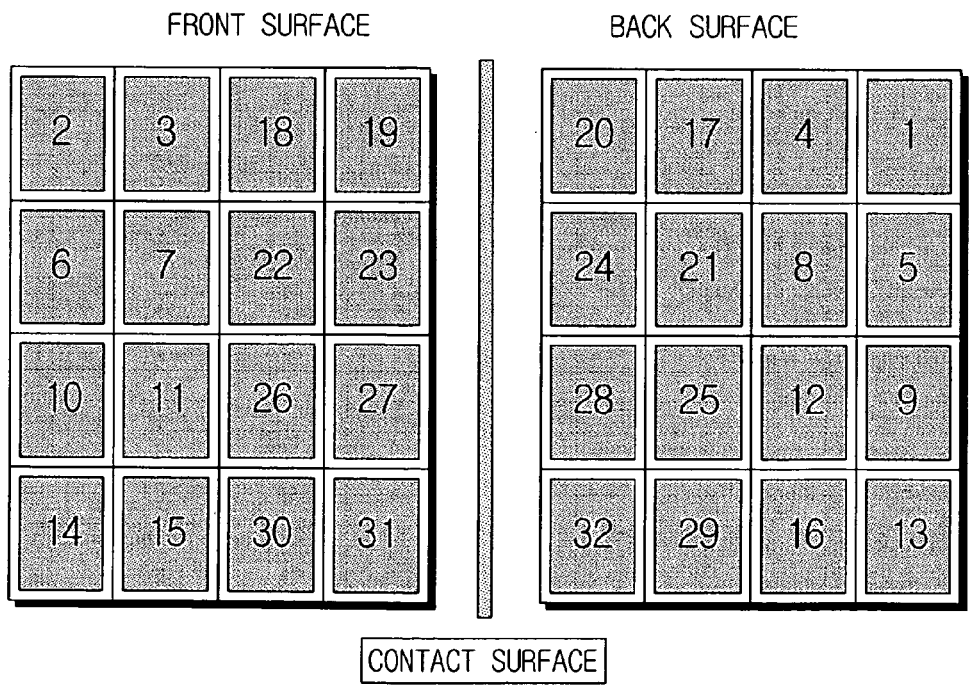
FIG. 4 is a diagram illustrating an arrangement of page images, according to an embodiment of the present general inventive concept, when a user sets the number of pages per sheet to 16 so that 32 pages are printed in total.

In the equations 1 and 2, k indicates a value equal to the number of total page images included on any one surface of the printing sheet divided by 4. For example, in FIG. 3, the number of total page images included on the front surface or on the back surface of the printing sheet is 8. Accordingly, as illustrated in FIG. 3, k is equal to 2 since the number of total page images on the front or back surface of the printing sheet is divided by 4. Similarly, In FIG. 4, the number of total page images included on the front surface or the back surface of the printing sheet is 16 i. Accordingly, as illustrated in FIG. 4, k is equal to 4 since the number of total page images on the front or back surface of the printing sheet is divided by 4.

In equations 1 and 2, m indicates a value equal to the number of printing sheets to be printed minus 1. For example, as illustrated in FIGS. 3 and 4, the number of printing sheets to be printed is 1, so that m is equal to 0 (1−1).

In FIG. 3, m=0 and k=2 as described above. When N=1 in equations 1 and 2, the page images with the page numbers (2, 3, 6, 7) and (1, 4, 5, 8) are obtained, respectively. In other words, it can be seen that respective upper four page numbers of front and back surfaces of the printing sheet are obtained when N=1.

When N=2, m=0, and k=2 in the equations 1 and 2, the page images with the page numbers (10, 11, 14, 15) and (9, 12, 13, 16) are obtained, respectively. In other words, it can be seen that respective lower four numbers of front and back surfaces are obtained when N=2.

FIG. 4 is a diagram illustrating an arrangement page images, according to an embodiment of the present general inventive concept, when the user sets the number of pages per sheet to 16 so that 32 pages are printed in total on the front and back surfaces of the printing sheet.

As described above, m is 0 and k is 4 in FIG. 4. When N is respectively changed by incrementing the value of N from 1 to 4 (in increments of 1) in the equations 1 and 2, page numbers of the page images may be calculated as illustrated in FIG. 4.

When m=0, k=4, and N=1 in the equations 1 and 2, the page images with the page numbers (2, 3, 6, 7) and (1, 4, 5, 8) are obtained, respectively. In other words, when N is 1 in FIG. 4, the equations 1 and 2 indicate four page numbers grouped together at an upper left of the front surface and an upper right of the back surface, respectively.

When m=0, k=4, and N=2 in the equations 1 and 2, the page images with the page numbers (10, 11, 14, 15) and (9, 12, 13, 16) are obtained, respectively. In other words, when N is 2 in FIG. 4, the equations 1 and 2 indicate four page numbers grouped together at a lower left of the front surface and a lower right of the back surface, respectively.

When m=0, k=4, and N=3 in the equations 1 and 2, the page images with the page numbers (18, 19, 22, 23) and (17, 20, 21, 24) are obtained, respectively. In other words, when N is 3 in FIG. 4, the equations 1 and 2 indicate four page numbers grouped together at an upper right of the front surface and an upper left of the back surface, respectively.

When m=0, k=4, and N=3 in the equations 1 and 2, the page images with the page numbers (26, 27, 30, 31) and (25, 28, 29, 32) are obtained, respectively. In other words, when N is 4 in FIG. 4, the equations 1 and 2 indicate four page numbers grouped together at a lower right of the front surface and a lower left of the back surface, respectively.

Figure 5:
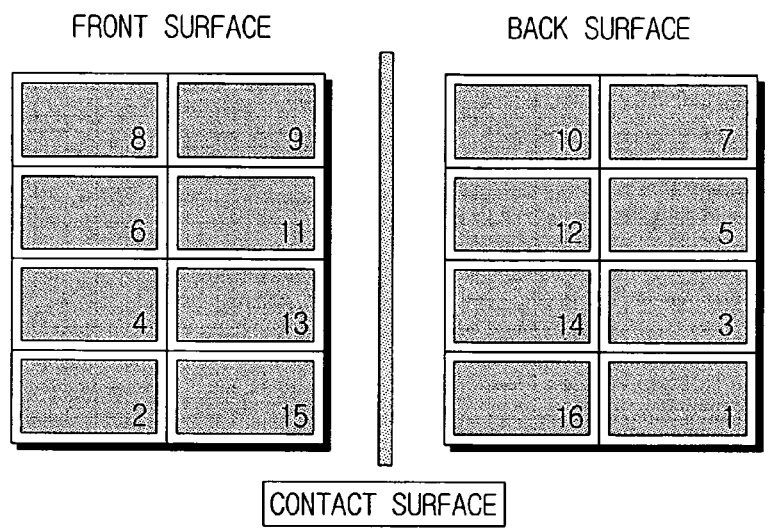
FIG. 5 is a diagram illustrating an arrangement of page images, according to another embodiment of the present general inventive concept, when a user sets the number of pages per sheet to 8 so that 16 pages are printed in total.

FIG. 5 is a diagram illustrating an arrangement of page images, according to another embodiment of the present general inventive concept, when a user sets a number of pages per surface of a printing sheet to 8 so that 16 pages are printed in total on front and back surfaces of the printing sheet.

Referring to FIG. 5, page numbers of an upper group of four page images on the front surface of the printing sheet, namely, (8, 9, 6, 11), and page numbers of a lower group of four page images on the front surface of the printing sheet, namely, (4, 13, 2, 15), are obtained based on equations 3 and 4, respectively.

$$(i/2, i/2+1, i/2-2, 1/2+3) \quad \text{Equation 3}$$

$$(i/2-4, 1/2+5, i/2-6, i/2+7) \quad \text{Equation 4}$$

In the equations 3 and 4, i indicates the total number of page images to be included on the printing sheet.

For example, in FIG. 5, the total number of page images to be included on the printing sheet is 16 so that i equals 16. Accordingly, when i is 16 in the equation 3, the page images with the page numbers (8, 9, 6, 11) are obtained, which are same as the page numbers of the upper group of four page images on the front surface of the printing sheet as illustrated in FIG. 5. Similarly, when i is 16 in the equation 4, the page images with the page numbers of (4, 13, 2, 15) are obtained, which are same as the page numbers of the lower group of four page images on the front surface of the printing sheet as illustrated in FIG. 5.

The page numbers of an upper group of four page images on the back surface of the printing sheet, namely, (10, 7, 12, 5), and the page numbers of a lower group of four page images on the back surface of the printing sheet, namely, (14, 3, 16, 1) are obtained based on equations 5 and 6, respectively.

$$(i/2+2, i/2-1, i/2+4, i/2-3) \quad \text{Equation 5}$$

$$(i/2+6, i/2-5, i/2+8, i/2-7) \quad \text{Equation 6}$$

In equations 5 and 6, i indicates the total number of page images to be included on the printing sheet, and has the same value as in the equations 3 and 4. As illustrated in FIG. 5, the total number of page images to be included on the printing sheet is 16 so that i equals 16.

When i is 16 in the equations 5 and 6, the page images with the page numbers (10, 7, 12, 5) and (14, 4, 16, 1) are obtained, respectively, which are the same as the page numbers of the upper and lower groups of four page images on the back surface of the printing sheet, respectively.

Figure 6:
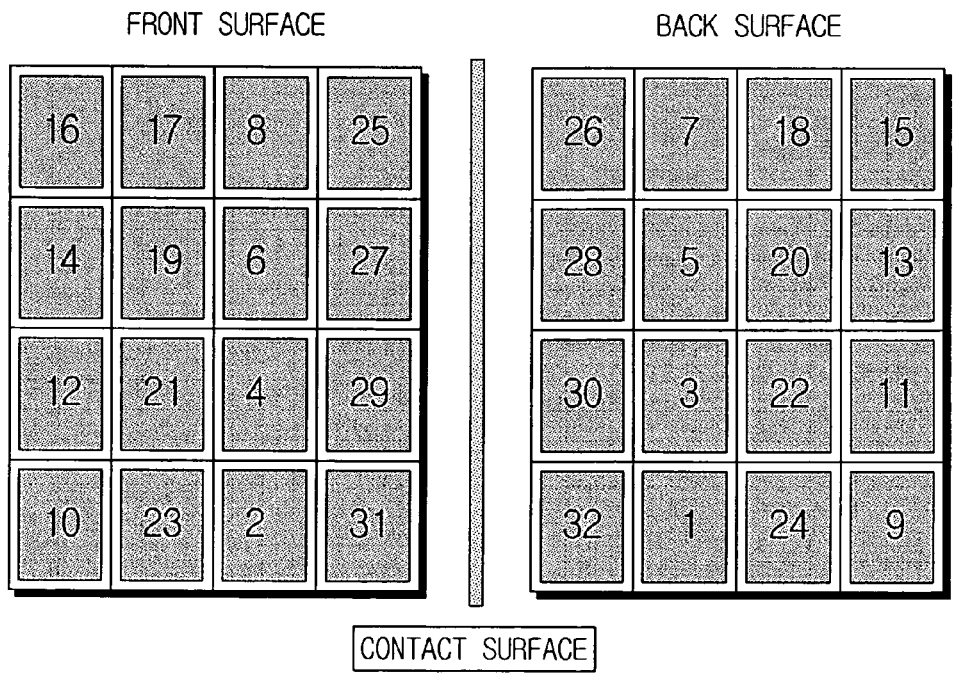
FIG. 6 is a diagram illustrating an arrangement of page images, according to another embodiment of the present general inventive concept, when a user sets the number of pages per sheet to 16 so that 32 pages are printed in total.

FIG. 6 is a diagram illustrating an arrangement of page images, according to another embodiment of the present general inventive concept, when a user sets the number of pages per surface of a printing sheet to 16 so that 32 pages are printed in total on the front and back surfaces of the printing sheet.

Referring to FIG. 6, i equals 32 since 32 pages are printed on the front and back surfaces of the printing sheet. When i is 32 in the equations 3 and 4, the page images with the page numbers (16, 17, 14, 19) and (12, 21, 10, 23) are obtained, respectively, which are the same as page numbers of upper left and lower left groups of four page images of the front surface of the printing sheet, respectively, as illustrated in FIG. 6. The page numbers of right page images of the front surface of the printing sheet in FIG. 6 are calculated by adding 8 to or subtracting 8 from corresponding left page numbers. In other words, page numbers of a third column, namely, (8, 6, 4, 2) are obtained by subtracting 8 from the corresponding page numbers of a first column, namely, (16, 14, 12, 10). In addition, page numbers of a fourth column, namely, (25, 27, 29, 31) are obtained by adding 8 to the corresponding page numbers of a second column, namely, (17, 19, 21, 23).

Furthermore, when i is 32 in the equations 5 and 6, the page images with the page numbers (18, 15, 20, 13) and (22, 11, 24, 9) are obtained, respectively, which are the same as the page numbers of upper right and lower right groups of four numbers of the back surface of the printing sheet, respectively, as illustrated in FIG. 6. The page numbers left page images of the back surface of the printing sheet in FIG. 6 are calculated by adding 8 to or subtracting 8 from corresponding right page numbers of the back surface. In other words, page numbers of a first column, namely, (26, 28, 30, 32) are obtained by adding 8 to the corresponding page numbers of a third column, namely, (18, 20, 22, 24). In addition, page numbers of a second column, namely, (7, 5, 3, 1) are obtained by subtracting 8 from the corresponding page numbers of the fourth column, namely, (15, 13, 11, 9).

Figure 7:
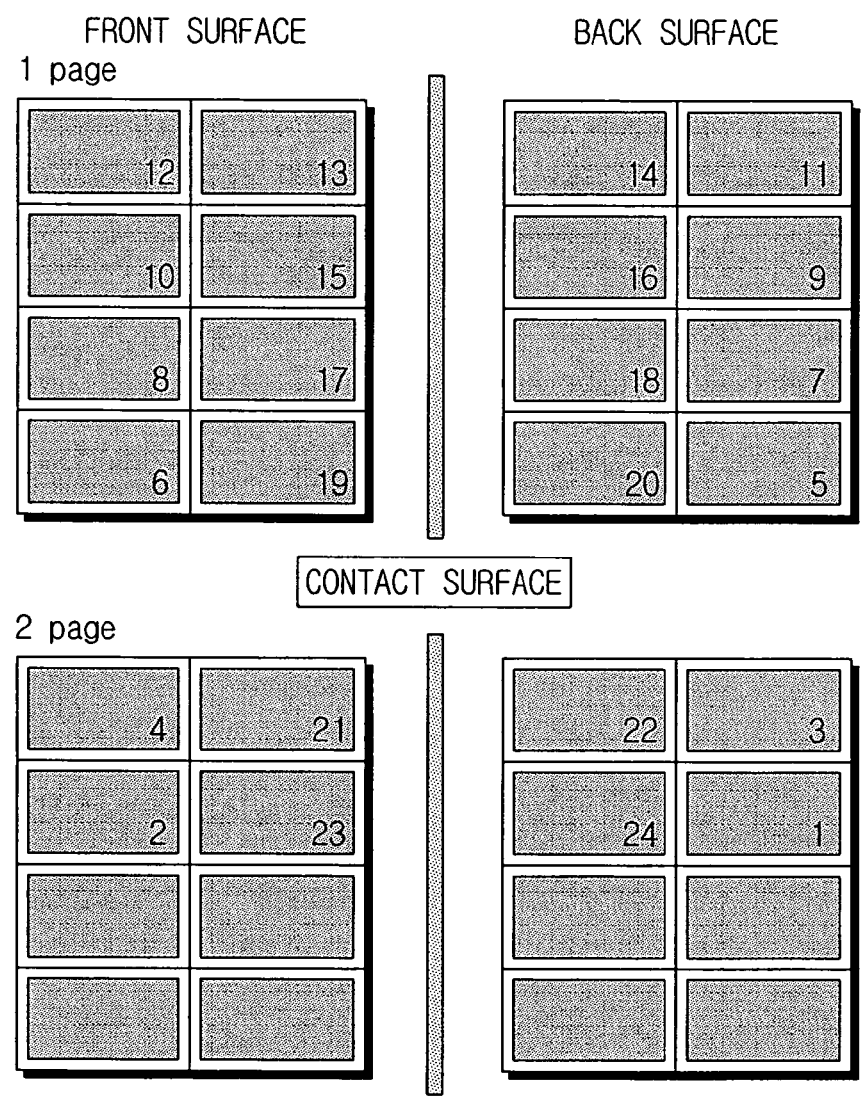
FIG. 7 is a diagram illustrating an arrangement of page images, according to another embodiment of the present general inventive concept, when a user sets the number of pages per sheet to 8 so that 24 pages are printed in total.

FIG. 7 is a diagram illustrating an arrangement of page images according to another embodiment of the when the user sets the number of pages per surface of a printing sheet to 8, and 24 pages are printed in total on the front and back surfaces of the printing sheets.

Referring to FIG. 7, upper four the page numbers of the pages of the front surface and the back surface of the printing sheet, namely, (12, 13, 10, 15) and (14, 11, 16, 9) are obtained when i is 24 in the equations 3 and 5, respectively. Other page numbers of pages of the front surface and the back surface can be calculated by subtracting 2 from or adding 2 to the page numbers of the pages in the same column. In other words, left page numbers of the front surface of the printing sheet decrease by 2 to be (12, 10, 8, 6) and (4, 2), and right page numbers of the front surface increase by 2 to be (13, 15, 17, 19) and (21, 23). On the contrary, left page numbers of the back surface of the printing sheet increase by 2 to be (14, 16, 18, 20) and (22, 24), and right page numbers of the back surface decrease by 2 to be (11, 9, 7, 5) and (3, 1).

The options of setting the page location as described above are only embodiments of the present general inventive concept, and other options of setting the page location may be implemented as well. The options of setting the page location may be implemented in a software fashion.

Figure 8:
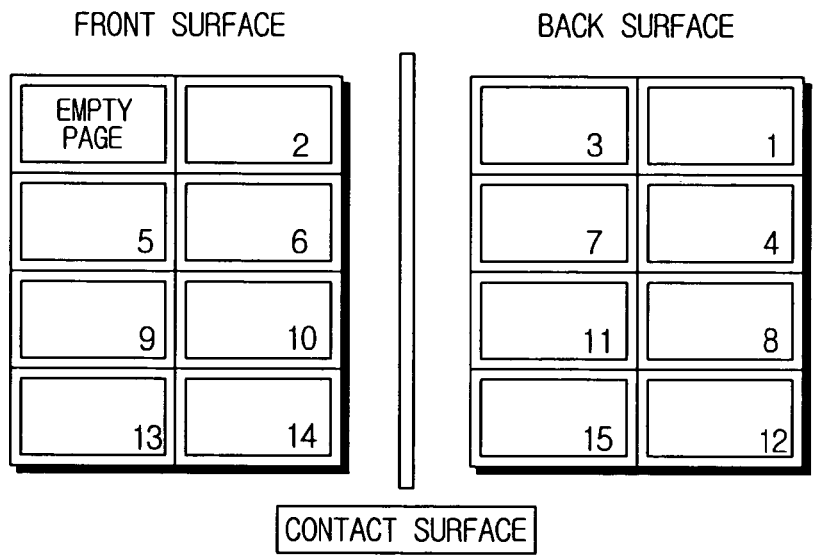
FIG. 8 is a diagram illustrating an arrangement of page images with an added empty page when a user sets a title page operation.

Referring to FIGS. 1 and 2, when the user makes the printing request after the user has set various options including the page location setting, the printer driver unit 20 checks whether the user has set the option of selecting the title page (S110). When the option of selecting the title page is set, an empty page is additionally prepared so as to allow the user to enter the title in a page to be printed first (S120). FIG. 8 is a diagram illustrating an arrangement of page images including the added empty page when the user has selected the title page.

The printer driver unit 20 then stores the total pages corresponding to a printing range in the storage unit 30, and calculates the number of stored pages (S130). When the option of selecting the title page is selected, the added empty page is included in the number of stored pages.

The stored pages are then arranged in the printer driver unit 20 in response to the predetermined page layout set by the user according to the options of setting the page location (S140).

Figure 9A:
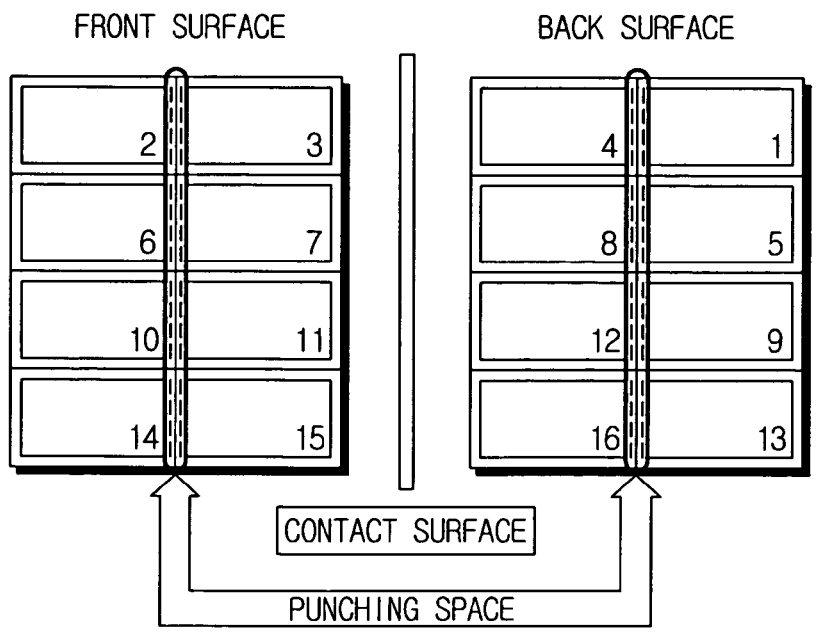
FIG. 9A is a diagram illustrating an arrangement of page images with punching spaces added between respective short sides thereof, according to an embodiment of the present general inventive concept.
Figure 9B:
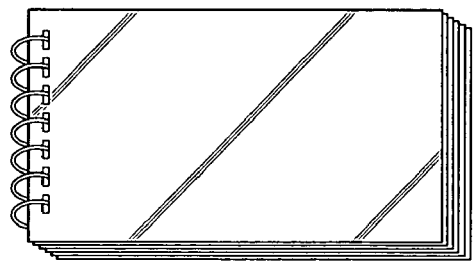
FIG. 9B is a diagram illustrating a booklet made according to the arrangement of FIG. 9A.
Figure 10A:
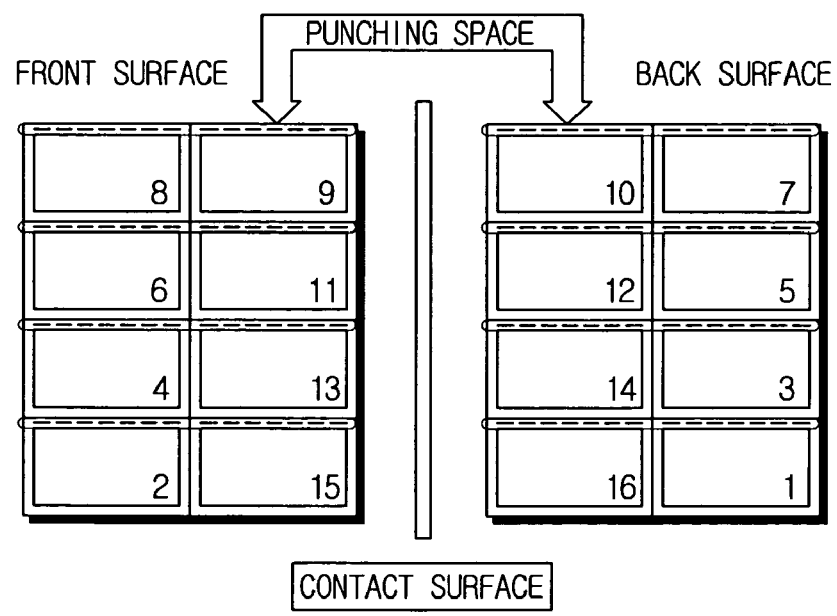
FIG. 10A is a diagram illustrating an arrangement of page images with punching spaces added between respective long sides thereof, according to another embodiment of the present general inventive concept.
Figure 10B:
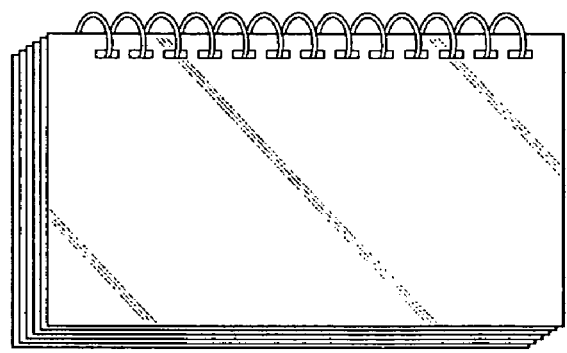
FIG. 10B is a diagram illustrating a booklet made according to the arrangement of FIG. 10A.

The printer driver unit 20 then checks whether the user has selected the punching operation (S150). When the punching operation is set by the user, a predetermined size of a punching space is set, and the page images are reduced by 1/N with respect to a remaining area after the punching space is excluded from a total area of the printing sheet (S160). In this case, N indicates the number of pages to be included in the front or back surface of one printing sheet. FIG. 9A is a diagram illustrating an arrangement of page images with the punching space between respective short sides of respective the pages, according to an embodiment of the present general inventive concept, and FIG. 9B illustrates a booklet made according to the arrangement of FIG. 9A. In addition, FIG. 10A is a diagram illustrating an arrangement of page images with the punching space between respective long sides of the pages, according to another embodiment of the present general inventive concept, and FIG. 10B shows a booklet made according to the arrangement of FIG. 10A.

When the user has not set the punching space, the punching space is not considered, and the page image is reduced by an N-up function in response to the page layout set by the user (S170). For example, when the number of pages per printing sheet is set as N, the page images are reduced by 1/N so that N page images may be included on one printing sheet.

When the page images are reduced, the page images are composed to be a single image in response to a layout set by the user, and the composed single image is in turn converted into a printing language suitable to be used in the emulation process. For example, when the page images are reduced by 1/N, N reduced page images are collected so that they are converted into the single image, and the composed single image is in turn converted into a printing language corresponding to the emulation process in the printer driver unit 20 (S180).

Operations S110 to S180 are described to be carried out in the printer driver unit 20, however, they are not limited thereto and may be carried out by an application program.

The composed single image is then transmitted to the printer 70 through the printer interface 40 (S190). The composed single image transmitted to the printer 70 is subjected to the emulation processing, and a printing operation is carried out (S200).

As described above, an N-up operation and a duplex operation may be used to allow a portable booklet to be readily made according to the present general inventive concept.

Furthermore, not only a title page may be set but also a punching space may be taken into consideration to carry out a printing operation, which allows a portable booklet to be facilitated for the user when the booklet is made according to the present general inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing method of making a booklet, the method comprising:
   requesting a printing task;
   calculating a number of pages corresponding to a printing range;
   arranging the pages within the printing range by arranging a plurality of pages on a front surface of a printing sheet according to the predetermined page layout based on the following equation, $$\{2(4(N+km)-3), 2*4(N+km)-5, 2(4(N+km)-1), 2*4(N+km)-1\}$$

wherein N is a grouping variable representing 4 page images grouped into one group, k is a value equal to the number of total page images to be included on any one surface of the printing sheet divided by 4, and m is a value equal to a number of printing sheets to be printed minus one;
   reducing images of the pages according to the predetermined page layout; and
   composing the reduced images of the pages into a single image according to the predetermined page layout, and transmitting the single image to a printer for printing.

2. The method as recited in claim 1, further comprising:
   checking whether an option of selecting a title page is set; and
   preparing a predetermined page to allow a title to be entered prior to a first page when the option of selecting the title page is set.

3. The method as recited in claim 1, further comprising:
   setting a punching space of a predetermined size; and
   reducing the images of the pages according to the predetermined page layout with respect to a remaining area of a printing sheet after the punching space is excluded from a total area of the printing sheet when an option of selecting a punching operation is set.

4. The method as recited in claim 1, wherein a duplex function is automatically set to print the reduced images of the pages on both sides of a printing sheet.

5. The method as recited in claim 1, wherein the arranging of the pages comprises arranging a plurality of pages on a back surface of a printing sheet according to the predetermined page layout based on the following equation, $$\{2*4(N+km)-7, 4(2(N+km)-1), 2*4(N+km)-3, 2*4(N+km)\}$$

wherein N is a grouping variable representing 4 page images grouped into one group, and k is a value equal to the number of total page images to be included on any one surface of the printing sheet divided by 4, and m is a value equal to a number of printing sheets to be printed.

6. A printing method of making a booklet, the method comprising:
   requesting a printing task;
   calculating a number of pages corresponding to a printing range;
   arranging the pages within the printing range according to a predetermined page layout;
   reducing images of the pages according to the predetermined page layout; and
   composing the reduced images of the pages into a single image according to the predetermined page layout, and transmitting the single image to a printed for printing,
   wherein the arranging of the pages comprises arranging a plurality of pages on a front surface of a printing sheet into an upper group of four pages and a lower group of four pages, calculated by the following respective equations when a number of pages per surface of the printing sheet is set as 8 so that 16 pages are to be printed in total on the front surface and a back surface of the printing sheet, $$(i/2, i/2+1, i/2-2, i/2+3)$$

$$(i/2-4, i/2+5, i/2-6, i/2+7)$$

wherein i is the number of total pages to be included on the printing sheet.

7. The method as recited in claim 6, wherein the arranging of the pages comprises arranging a plurality of pages on a back surface of a printing sheet into an upper group of four pages and a lower group of four pages, calculated by the following respective equations when the number of pages per surface of the printing sheet is set as 8 so that 16 pages are to be printed in total on the back and a front surface of the printing sheet, $$(i/2+2, i/2-31\ 1, i/2+4, i/2-3)$$

$$(i/2+6, i/2-5, i/2+8, i/2-7)$$

wherein i is the number of total pages to be included on the printing sheet.

8. The method as recited in claim 6, wherein the arranging of the pages comprises forming an upper left group of four pages and a lower left group of four pages on a front surface of a printing sheet based on the following respective equations when the number of pages per surface of the printing sheet is set as 16 so that 32 pages are to be printed in total on the front and a back surface of the printing sheet, $$(i/2, i/2+1, i/2-2, i/2+3)$$

$$(i/2-4, i/2+5, i/2-6, i/2+7)$$

wherein i is the number of total pages to be included on the printing sheet.

9. The method as recited in claim 8, wherein right pages on the front surface of the printing sheet are obtained by adding 8 to or subtracting 8 from corresponding left pages.

10. The method as recited in claim 6, wherein the arranging of the pages comprises forming an upper right group of four page numbers and a lower right group of four page numbers on a back surface of a printing sheet based on the following respective equations when the number of pages per surface of the printing sheet is set as 16 so that 32 pages are to be printed in total on the back surface and a front surface of the printing sheet, $$(i/2+2, i/2-1, i/2+4, i/2-3)$$

$$(i/2+6, i/2-5, i/2+8, i/2-7)$$

wherein i is the number of total pages to be included one the printing sheet.

11. The method as recited in claim 10, wherein left pages on the back surface of the printing sheet are obtained by adding 8 to or subtracting 8 from corresponding right pages.

12. A method of printing a booklet, the method comprising:
    arranging a plurality of pages of a document on front and back surfaces of one or more printing sheets according to page numbers of the plurality of pages and a predetermined number of pages to be printed on each of the front and back surfaces of each of the one or more printing sheets;

grouping the plurality of pages into groups of a predetermined number and arranging the groups of the predetermined number according to the page numbers of the plurality of pages is based on the following equations corresponding to the front and back surfaces of the one or more printing sheets, respectively, {2(4(N+km)−3), 2*4(N+km)−5, 2(4(N+km)−1), 2*4(N+km)−1}

{2*4(N+km)−7, 4(2(N+km)−1), 2*4(N+km)−3, 2*4(N+km)} wherein N represents the groups of four, k is equal to the number of pages to be printed on each surface of each of the one or more printing sheets divided by four, and m is equal to the total number of printing sheets required minus 1;

reducing each image of the plurality of pages to fit on the front and back surfaces of the one or more printing sheet as arranged; and printing the reduced images of the plurality of pages on the one or more printing sheets with a printer.

13. The method as recited in claim 12, wherein the grouping the plurality of pages into groups and arranging the groups is according to the page numbers of the plurality of pages, the number of pages to be printed on each of the front and back surfaces of each of the one or more printing sheets, and a total number of printing sheets required.

14. The method as recited in claim 12, further comprising:
determining whether a title page is requested; and
when the title page is requested, arranging the plurality of pages of the document on the one or more printing sheets with respect to the title page.

15. The method as recited in claim 12, further comprising:
providing a punching space of a predetermined size between the plurality of pages arranged on the front and back surfaces of the one or more printing sheets.

16. A computer readable storage medium storing computer readable codes to perform a method of printing a booklet, the method comprising operations of:
arranging a plurality of pages of a document on front and back surfaces of one or more printing sheets according to page numbers of the plurality of pages and a predetermined number of pages to be printed on each of the front and back surfaces of each of the one or more printing sheets;

grouping the plurality of pages into groups of a predetermined number and arranging the groups of the predetermined number according to the page numbers of the plurality of pages is based on the following equations corresponding to the front and back surfaces of the one or more printing sheets, respectively, {2(4(N+km)−3), 2*4(N+km)−5, 2(4(N+km)−1), 2*4(N+km)−1}

{2*4(N+km)−7, 4(2(N+km)−1), 2*4(N+km)−3, 2*4(N+km)} wherein N represents the groups of four, k is equal to the number of pages to be printed on each surface of each of the one or more printing sheets divided by four, and m is equal to the total number of printing sheets required minus 1;

reducing each image of the plurality of pages to fit on the front and back surfaces of the one or more printing sheet as arranged; and printing the reduced images of the plurality of pages on the one or more printing sheets.

17. The computer readable storage medium as recited in claim 16, wherein the operation of grouping the plurality of pages into groups and arranging the groups is according to the page numbers of the plurality of pages, the number of pages to be printed on each of the front and back surfaces of each of the one or more printing sheets, and a total number of printing sheets required.

18. The computer readable storage medium as recited in claim 16, further comprising an operation of:
determining whether a title page is requested; and
when the title page is requested, arranging the plurality of pages of the document on the one or more printing sheets with respect to the title page.

19. The computer readable storage medium as recited in claim 16, further comprising an operation of:
providing a punching space of a predetermined size between the plurality of pages arranged on the front and back surfaces of the one or more printing sheets.

* * * * *

UNITED STATES PATENT AND TRADEMARK OFFICE
CERTIFICATE OF CORRECTION

| | | |
|---|---|---|
| PATENT NO. | : 7,619,770 B2 | Page 1 of 1 |
| APPLICATION NO. | : 11/126349 | |
| DATED | : November 17, 2009 | |
| INVENTOR(S) | : Eun-ok Park | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1225 days.

Signed and Sealed this

Twenty-sixth Day of October, 2010

David J. Kappos
*Director of the United States Patent and Trademark Office*